Patented Apr. 3, 1923.

1,450,617

UNITED STATES PATENT OFFICE.

JAMES SMITH, OF GLASGOW, SCOTLAND.

PROCESS OF PURIFYING MINERAL OILS.

No Drawing.    Application filed March 23, 1921. Serial No. 454,731.

*To all whom it may concern:*

Be it known that I, JAMES SMITH, a subject of the King of the United Kingdom of Great Britain and Ireland, and residing at Glasgow, Scotland, have invented a certain new and useful Improvement in Processes of Purifying Mineral Oils, of which the following is a specification.

This invention has for its object the extraction from petroleum, paraffin or other mineral oils, of the deleterious substances such as phosphorus or sulphur which are the cause of imperfect combustion and objectionable odours, whereby to increase their value as illuminants or as propellants.

According to the invention I saturate absorbent cotton waste with a strong solution of alkali either in caustic, carbonate or bicarbonate forms, or a mixture of any of them, and then press all superfluous solution out. I then transfer the saturated cotton to oil in a container which is capable of being subjected to pressure. I apply heat, either internally by means of a worm pipe immersed in the oil and supplied with steam flowing through the pipe without contacting with the oil, or externally, until the pressure within the container reaches at least 100 lbs. to the square inch and maintain for a period such as three hours the conditions thus established. I may increase the pressure according to the nature of the oil being treated, i. e., if the specific gravity of the oil be .750 the pressure is not increased beyond 100 lbs. to the square inch but, with heavier oils, the pressure should be raised and may reach as high as 150 lbs. to the square inch. With oil of a specific gravity of .750 the temperature corresponding to 100 lbs. to the square inch, is approximately 230° F. The proportion of alkali to oil varies from 1% to 5% according to the oils being treated, the lighter oils requiring the least alkali.

After conversion the oil can be run off and redistilled, and the cotton waste or other absorbent washed free from impurities with hot water and used for the next charge.

I claim:

The herein described process of purifying mineral oil consisting in digesting the oil under pressure with absorbent cotton waste saturated with alkali by application of steam heat without contact of the steam with the oil while excluding the air from the oil.

In testimony whereof I have signed my name to this specification in the presence of two subscribing witnesses.

JAMES SMITH.

Witnesses:
 KATE YOTHERINGHAM,
 ANNE A. WILL..